United States Patent [19]

Chmelir

[11] Patent Number: 5,856,370
[45] Date of Patent: Jan. 5, 1999

[54] CROSS-LINKED SYNTHETIC POLYMERS HAVING A POROUS STRUCTURE, A HIGH ABSORPTION RATE FOR WATER, AQUEOUS SOLUTIONS AND BODY FLUIDS, A PROCESS FOR THEIR PRODUCTION AND THEIR USE IN THE ABSORPTION AND/OR RETENTION OF WATER AND/OR AQUEOUS LIQUIDS

[75] Inventor: Miroslav Chmelir, Krefeld, Germany

[73] Assignee: Stockhausen GmbH & Co. KG, Krefeld, Germany

[21] Appl. No.: 663,117

[22] PCT Filed: Dec. 19, 1994

[86] PCT No.: PCT/EP94/04221

§ 371 Date: Jun. 24, 1996

§ 102(e) Date: Jun. 24, 1996

[87] PCT Pub. No.: WO95/17455

PCT Pub. Date: Jun. 29, 1995

[30] Foreign Application Priority Data

Dec. 23, 1993 [DE] Germany .......................... 43 44 224.2

[51] Int. Cl.⁶ ...................................... C08J 9/02
[52] U.S. Cl. ............................ 521/128; 521/95; 521/133; 521/149
[58] Field of Search ............................. 521/95, 133, 149, 521/128

[56] References Cited

U.S. PATENT DOCUMENTS 4,918,110  4/1990  Kuo et al. .................................. 521/95
5,026,738  6/1991  Meinhard .................................. 521/95
5,219,969  6/1993  Uhl et al. ................................. 526/304

FOREIGN PATENT DOCUMENTS

B391321   3/1990  Australia .
63-056511 3/1988  Japan .

*Primary Examiner*—John M. Cooney, Jr.
*Attorney, Agent, or Firm*—Oblon, Spivak, McClelland, Maier & Neustadt, P.C.

[57] ABSTRACT

The present invention relates to cross-linked synthetic polymers based on acrylic acid and its derivatives, which have a high absorption capacity and an improved absorption rate for water, aqueous solutions and body fluids, to a process for their production by radical polymerization under such conditions that polymers are obtained which have a porous structure and a swelling degree-dependent particle density so that the polymer particles are floatable in water or aqueous liquids. The present invention further relates to the use of these polymers for the absorption and/or retention of water and for the release of water and/or an active substance solution to a surrounding medium. The porous structure of the polymers is formed by nitrogen dispersed in the polymer, with at least one azo compound being added to the aqueous monomer solution as polymerization initiator and blowing agent, which azo compound has a half-time of at least 10 hours at a temperature of 30° to 120° C.

30 Claims, No Drawings

CROSS-LINKED SYNTHETIC POLYMERS HAVING A POROUS STRUCTURE, A HIGH ABSORPTION RATE FOR WATER, AQUEOUS SOLUTIONS AND BODY FLUIDS, A PROCESS FOR THEIR PRODUCTION AND THEIR USE IN THE ABSORPTION AND/OR RETENTION OF WATER AND/OR AQUEOUS LIQUIDS

The present invention relates to cross-linked synthetic polymers based on acrylic acid and its derivatives, which have a high absorption capacity and an improved absorption rate for water, aqueous solutions and body fluids. The present invention further relates to a process for their preparation by means of radical polymerization under conditions that result in polymers having a porous structure and a particle density which depends on the swelling degree so that the polymer particles are floatable in water or aqueous liquids. The present invention further relates to the use of these polymers for the absorption and/or retention of water and for the release of water or aqueous solutions and/or an active substance solution to a surrounding medium.

Various patents describe different synthetic polymers having an absorbing capacity for water and body fluids, e.g., cross-linked polymers and copolymers based on acrylic or methacrylic acid (U.S. Pat. No. 4,018,951; U.S. Pat. No. 4,066,583; U.S. Pat. No. 4,062,817; U.S. Pat. No. 4,066,583; DE-OS 26 13 135; DE-OS 27 12 043; DE-OS 28 13 634) or acrylamidopropane sulfonic acid copolymers (DE-PS 31 24 008). These absorbents are virtually insoluble in water and absorb in equilibrium with aqueous liquids several times their own weight of water, urine, or other aqueous solutions. Some patents also describe other properties of the synthetic absorbents in addition to the high liquid absorption capacity, e.g., low residual monomer content, low portion of water-soluble moieties, and high gel strength of the swollen polymer particles.

U.S. Pat. No. 4,529,739 and U.S. Pat. No. 4,649,164 describe polymers which have a porous structure and are based on methacrylic acid. They are obtained from ethyl acrylate/methacrylic acid copolymer latices under addition of compounds capable of separating carbon dioxide, e.g., sodium hydrogencarbonate. Austrian patent AT 391 321 B describes cross-linked, porous acrylic polymers which are produced by adding a nitrogen-containing blowing agent to the monomer solution. According to this method an N-containing blowing agent decomposing to ammonia and carbon dioxide at 80° to 250° C. is added to acrylic acid, either before or after the polymerization. The acrylic acid is neutralized to the extent of 60–100% with NaOH, KOH or $NH_3$, and the added quantity of N-containing blowing agent corresponds to an increase in the neutralization degree to 102 to 140%. Ammonium salts of inorganic or organic acids and urea are mentioned as blowing agents, ammonium carbonate being preferred. U.S. Pat. No. 5,118,719 also describes ammonium and alkali carbonates used as blowing agents which are added to the monomer solution prior to polymerization. Owing to the carbonate decomposition during polymerization, carbon dioxide is formed and causes the formation of a "microcellular structure" in the hydrogel. This may explain the improved absorption rate for liquids of the final product.

The use of alkali or ammonium carbonates prior to or during the polymerization of organic acids according to U.S. Pat. No. 4,529,739, U.S. Pat. No. 4,649,164, U.S. Pat. No. 5,118,719 results in the formation of carbon dioxide during the neutralization of the monomer solution. Since $CO_2$ has a limited solubility in the monomer solution and in the polymer gel mass, only relatively small amounts of $CO_2$ can be incorporated into the polymer during polymerization or drying. Also, the alternative according to AT 391 321 B, i.e., to add the blowing agent to the polymer gel prior to drying, does not result in the desired effect because of the superficial action of the aftertreatment. This method has the disadvantage that the added water amount must be removed during drying. Also, an excessive use of ammonia does not result in highly porous structures in swollen gel condition, since ammonia is readily soluble in water or aqueous liquids. Thus it is dissolved during swelling and the porosity of the hydrogel particles substantially disappears. Moreover, the addition of ammonia and carbonate increases the pH of the final product to far beyond 7, and this greatly restricts the applicability of the products.

Starting from a water-soluble polymer based on acrylic acid, WO 88/09801 describes the production of a cross-linked, foamed ethyl acrylate/acrylic acid copolymer having a specific density of 0.20 $g/cm^3$. The final product is manufactured in aqueous solution, and a subsequent cross-linkage and foaming operation under the addition of a cross-linker and a blowing agent, e.g., sodium hydrogencarbonate, p-toluenesulfonyl hydrazine or azo carboamide, is conducted in one process step. The drawback of this method is the fact that working in an aqueous solution is necessary and that the concentration is limited, e.g., to 18%-wt., because of the high viscosity in order to improve handling of the copolymer. Additionally, large amounts of blowing agent, e.g., 27%-wt., relative to the copolymer, are required.

As is known from AT 391 321 B very small amounts of azo compounds, e.g., 0.056%-wt., relative to the monomer, are normally used as polymerization initiators. In case of higher concentrations of such radical formers, the excess of free radicals will result in polymers having a lower molecular weight and in products having insufficient absorbing properties.

Another feature of the known polymers capable of absorbing water or aqueous liquids is the fact that they cannot float on the liquid surface when placed into water or aqueous liquids in unswollen condition and after liquid absorption, unless they comprise auxiliary agents, such as cork flour, as described in EP 0 285 404 B1.

Accordingly, there was the object to avoid the above-mentioned drawbacks and to obtain absorbents having a porous structure, good absorption properties, in particular an improved absorption rate, and a low average total density of the individual particles, so that the polymer particles, particularly in swollen state, are able to float on the water surface.

Most surprisingly, it was found that water-swellable, cross-linked, particulate polymers having a porous structure and a high absorption rate for water and aqueous liquids and a density of below 1.0 $g/cm^3$ in swollen condition and a density of above 1.0 $g/cm^3$ in dry condition can be produced in higher concentrations by means of radical polymerization in aqueous solution by using at least one azo compound simultaneously as polymerization initiator and blowing agent. Suitable azo compounds are those having a half-time of 10 hours or more at a temperature ranging from 30° to 120° C., preferably in the temperature range of 60° to 120° C. The azo compounds are added to the monomer solution prior to polymerization. For preference, the following azo compounds are used:

1. Azonitrile-compounds:

2,2'-azobis(4-methoxy-2,4-dimethylvaleronitrile),
2,2'-azobis(2-cyclopropyl propionitrile),
2,2'-azobis(2,4-dimethylvaleronitrile),
2,2'-azobis(2-methylpropionitrile),
2,2'-azobis(2-methylbutyronitrile),
1,1-azobis(cylcohexane-1-carbonitrile),
1-[(1-cyano-1-methyl ethyl)azo]formamide (2-(carbamoyl azo)isobutyronitrile, and
2-phenylazo-4-methoxy-2,4-dimethylvaleronitrile.

2. Azoamidine-compounds:

2,2'-azobis(2-methyl-N-phenylpropionamidine) dihydrochloride,
2,2'-azobis[N-(4-chlorophenyl)-2-methylpropionamidine] dihydrochloride,
2,2'-azobis[N-(4-hydroxyphenyl)-2-methylpropionamidine] dihydrochloride,
2,2'-azobis[N-(4-aminophenyl)-2-methylpropionamidine] tetrahydrochloride,
2,2'-azobis[2-methyl-N-(phenylmethyl)-propionamidine] dihydrochloride,
2,2'-azobis[2-methyl-N-2-propenyl propionamidine] dihydrochloride,
2,2'-azobis(2-methylpropionamidine) dihydrochloride, and
2,2'-azobis[N-(2-hydroxyethyl)-2-methyl-propionamidine] dihydrochloride.

3. Cyclic azoamidine-compounds:

2,2'-azobis[2-(5-methyl-2-imidazoline-2-yl)propane] dihydrochloride,
2,2'-azobis[2-(2-imidazoline-2-yl)propane]dihydrochloride,
2,2'-azobis[2-(4,5,6,7-tetrahydro-1H-1,3-diazepine-2-yl) propane]dihydrochloride,
2,2'-azobis[2-(3,4,5,6-tetrahydropyrimidine-2-yl)propane] dihydrochloride
2,2'-azobis[2-(5-hydroxy-3,4,5,6-tetrahydropyrimidine-2-yl)propane]dihydrochloride,
2,2'-azobis{2-[1 -(2-hydroxyethyl)-2-imidazoline-2-yl] propane}dihydrochloride, and
2,2'-azobis[2-(2-imidazoline-2-yl) propane].

4. Azoamide-compounds:

2,2'-azobis{2-methyl-N-[1,1-bis(hydroxymethyl)-2-hydroxyethyl]propionamide},
2,2'-azobis{2-methyl-N-[1,1,-bis(hydroxymethyl)ethyl] propionamide},
2,2'-azobis[2-methyl-N-(2-hydroxyethyl)propionamide], and
2,2'-azobis(2-methylpropionamide) dihydrate.

5. Alkylazo and other azo compounds:

2,2'-azobis(2,4,4-trimethylpentane),
2,2'-azobis(2-methylpropane),
dimethyl 2, 2'-azobis(2-methylpropionate),
4,4'-azobis(4-cyanovaleric acid), and
2,2'-azobis[hydroxymethyl)propionitrile].

In swollen condition, the water-swellable, cross-linked, particulate polymers according to the present invention preferably have an average particle density of 0.900 to 0.999 g/cm$^3$ and a particle-size distribution of the particles in a range of 0.1 to 5.0 mm, in particular of 0.8 to 3 mm.

The monomers primarily used are acrylic acid, methacrylic acid, acrylamidomethylpropane sulfonic acid, the salts of these acids, in particular alkali, alkaline-earth, and ammonium salts, as well as acrylamide and methacrylamide. The above monomers may either be used alone for the production of homopolymers or in mixture with one another for the production of copolymers. For the production of copolymers the above monomers may also be used with other water-soluble monomers, such as water-soluble polymerizable acids, preferably maleic acid, fumaric acid, itaconic acid, or vinyl sulfonic acid, or the salts of these acids. Further suitable monomers are acrylonitrile, methacrylonitrile, vinyl pyridine, vinyl acetate, hydroxy group-containing esters of polymerizable acids, in particular the hydroxyethyl- and hydroxypropyl esters of acrylic and methacrylic acid, as well as amino group-containing and ammonium group-containing esters and amides of polymerizable acids, such as the dialkyl aminoesters, in particular the dimethyl- and diethylaminoalkyl esters of acrylic and methacrylic acid, as well as the trimethyl- and trimethylammonium alkyl esters, as well as the corresponding amides. Small amounts of water-insoluble monomers may also additionally be copolymerized with the above monomers. For instance, esters of the acrylic and/or methacrylic acid with $C_1$–$C_{10}$ alcohols, styrene, and alkylated styrenes. In general the portion of water-soluble monomers amounts to 80 to 100%-wt., relative to the total monomers. In general the water-insoluble (hydrophobic) monomers come up to 0 to 20%-wt., preferably up to 10%-wt., of the monomers. The polymerization may also completely or partially be carried out as graft polymerization in the presence of other polymeric substances, such as oligo- and polysaccharides, or polyvinyl alcohol.

Utilizing the different decomposition properties these azo compounds may also be used in combination. The concentration of the blowing agent additive in the monomer solution amounts to 0.1 to 5.0%-wt., preferably 0.2 to 2.0%-wt.

The water-absorbing polymeric absorbents are mostly obtained by using at least one cross-linking monomer. Compounds which comprise at least 2 or more functional groups, e.g., double-bonds or epoxy groups, and are capable of incorporating themselves into the growing polymer chains during polymerization are used as cross-linking monomers. Thus, cross-links at different sites in the polymer are formed in the polymer during polymerization or during a subsequent reaction of functional groups. These cross-links couple the individual polymer chains and cause the polymer particles to swell in a liquid without dissolution. The properties of the cross-linked polymer are determined by the chemical structure of the cross-linking agent, the number of cross-links and also by the distribution in the polymer chains. Examples of cross-linking monomers include bi- or polyfunctional monomers, e.g., amides, such as methylene bisacrylamide or methylene methacrylamide or ethylene bisacrylamide, also esters of polyols, such as diacrylates or triacrylates, e.g., butanediol- or ethylene glycol diacrylate, trimethylol propane triacrylate, glycidyl methacrylate, glycerol triglycidyl ether, vinyl methacrylate and allyl compounds, such as allyl (meth)acrylate, triallyl cyanurate, maleic acid diallyl ester, polyallyl ester, tetraallyloxyethane, triallyl amine, tetraallyl ethylenediamine, allyl esters of phosphoric acid or of phosphorous acid, and cross-linkable monomers, such as N-methylol compounds of amides, such as the methacrylamide or acrylamide, and the ethers derived therefrom. The portion of cross-linking comonomers amounts to about 0.01 to 10%-wt., preferably 0.10 to 2.0%-wt., relative to the total monomers. In case of an optimum incorporation of the cross-linking agent into the polymer, cross-linked polymers will result in which the cross-links are distributed evenly so that non-cross-linked or even uncross-linked regions, i.e. water-soluble, low-molecular portions in the polymer, will scarcely be found. An adequate concentration and even distribution of cross-links in the polymer will result in a product having an optimum retention capacity for water and aqueous liquids and an optimum gel strength in swollen condition.

Polymerization may be started by using a redox catalyst system as initiator or by means of photopolymerization. The redox catalyst system normally consists of two components, an inorganic or organic peroxide-containing compound and a reducing component, such as sulfite, hydrosulfite, thiosulfate, sulfinic acid, ascorbic acid and its salts, copper-, iron(II)-, or manganese salts. Suitable inorganic peroxide compounds include the alkali or ammonium peroxides, such as potassium peroxide sulfate, hydrogen peroxide or peroxomono- or diphosphoric acid and their salts, or organic peroxides, such as benzoyl peroxide, butyl hydroperoxide. In addition to the usual two-component first initiator system further will be used one or several azo compounds as initiator and blowing compounds. For photopolymerization which may be initiated by UV-containing light so-called photoinitiators are used, e.g., benzoin or benzoin derivatives, such as benzoin ether, benzil, benzil ketal and other derivatives, acrylic diazonium salts, or acetophenone derivatives. Also here, the used blowing agents may serve as initiators, wherein the dosage of the UV-light is important for the polymerization. The amounts of the peroxide-containing component and of the reducing component are in the range of 0.0005 to 0.5%-wt., preferably 0.001 to 0.1%-wt., relative to the monomer solution. The amount of photoinitiators not being azo compounds is in the range of 0.001 to 0.1%-wt., preferably of 0.002 to 0.05%-wt., relative to the monomer solution.

The polymerization may be carried out according to the known methods in solution or suspension. It is preferred, however, that the polymerization be carried out in aqueous solution, either discontinuously in a polymerization vessel or continuously on an endless belt, for instance, according to DE-PS 35 44 770. In a practically adiabatic course of polymerization, an aqueous polymer gel results when an adequate initial concentration of 15 to 50%-wt. of the monomers, relative to the monomer solution is used. By choosing the initial monomer concentration and a low starting temperature ranging from 0° to 50° C., preferably from 10° to 25° C., the polymerization can be conducted such that the maximum temperature in the resulting aqueous polymer gel is in the range of 100°–130° C., preferably of 110°–120° C. Polymerization may be conducted under normal or increased pressure, normal pressure being preferred.

In the end phase of polymerization the consistency of the resulting polymer gel is sufficiently strong to keep the nitrogen, which forms in this production phase during the partial decomposition of the initiator and blowing agent, in a finely dispersed manner enclosed as separate gas bubbles at elevated temperatures, e.g., of 100° to 120° C.; the gas bubbles have a relatively small volume and the pressure may optionally be increased.

When the polymerization is completed, the polymer gel such produced is crumbled and dried at temperatures of 100° to 240° C., preferably at 120° to 180° C. During drying, the portion of excess azo compound which has not decomposed during polymerization decomposes at these temperatures. The liberating nitrogen is also enclosed and kept in the dry polymer in the form of very small micro-bubbles. Thereby a polymer forms which has a very porous structure and the average total density of the polymer particles obtained after grinding is below the density of the polymer itself. When the polymers according to the present invention are used together with water or aqueous liquids, the finely dispersed gas volumes increase during the swelling process, thereby a swollen hydrogel with a reduced gel strength in equilibrium state results. At the same time, the average total density of the swollen particles decreases continuously in dependence on the swelling degree, until a value of less than 1.0 g/cm$^3$ is achieved. The polymer particles which were heavier than water in the solid, dry state first, rise up and float in swollen condition on the water or liquid surface.

The polymers according to the present invention are used in products for the absorption and/or retention of water and/or aqueous liquids, in particular of body fluids, such as urine or blood, preferably in absorbent disposables for hygienic purposes, such as diapers, incontinence articles, sanitary napkins and tampons, as well as for medical purposes.

In addition to the use as liquid-absorbing component having an increased absorption rate in hygiene products, the polymers according to the present invention may also advantageously be used for the following purposes:

1) The polymers may be used for a controlled and selective release of additional substances to other bodies; these substances have either been incorporated into the polymers subsequently, e.g. by obsorption, or are already present in the polymer; for example for the dosage of drugs, nutrients, insecticides and herbicides into an aqueous medium, preferably in large water containers, water pools or on large bodies of water, such as in inland water or in the sea. Another example is the release of nutrients to water plants, or to growth media for the cultivation of plants. The polymers which are floatable both in freshwater and in sea-water may selectively be used for insect control, e.g., against mosquito larvae, or in the distribution of herbicides, preferably on larger bodies of water. In this connection, the active substances contained in the polymer are advantageously primarily be distributed on the water surface.

2) Owing to their large surface, these polymers may also find a limited use in the absorption and/or retention of substances dissolved or dispersed in the water, this also applies to partially water-soluble or even water-insoluble substances floating on the water surface.

3) The polymers may be used for the production of absorption materials in which the polymers according to the present invention are to be separated from other, non-floatable materials (e.g, cellulose, plastics, earth, clay, and the like) because of the different specific weights of the polymers in swollen condition, e.g., in recycling.

If the polymers according to the present invention are used in absorbent articles, the absorbent articles are comminuted mechanically and placed into water or aqueous liquids, and the polymer particles are separated in swollen state.

Examples of substances suitable for the incorporation in the polymers according to the present invention include, nutrients for plants, herbicides, fungicides, various insecticides, disinfectants, drugs, anti-bacterial agents, fragrances for perfuming, and others, for example those described in DE 40 29 591 A1. The active ingredients may be incorporated in the polymer by direct addition to the monomer solution, provided the polymerization course is not distrubed. In case these substances affect the polymerization, they may be included either during or after completed polymerization by means of incorporating them into the obtained polymer gel. This is described, for example, in DE 40 29 591 A1, DE 40 29 592 A1, or DE 40 29 593 A1. Substances having a density of below 1.0 g/cm³, such as ground plastic or natural cellular plastics or cork flour, may additionally be incorporated in this manner. For the release of the active ingredients contained in the polymer in a controlled manner it is advantageous that the incorporated substances are water-soluble. On the other hand, in particular when a slow release of the active ingredients to other bodies is desired, substances which are insoluble or only partially soluble in water may also be used. A good water dispersibility of the active substances may also be sufficient for their use according to the present invention.

The present invention will be illustrated in more detail by means of the following examples.

EXAMPLE 1

In a polymerization vessel, 0.9 g methylene bisacrylamide and 192 g acrylamide were dissolved in 500 g water first and mixed with 84 g acrylic acid. Then, the monomer solution was neutralized with 102 g potassium hydroxide solution (45%), cooled to 10° C. and blown out with nitrogen. After addition of the catalyst solutions (1.6 g sodium peroxidisulfate, 0.2 g hydrogen peroxide (35%) and 0.01 g ascorbic acid) and 10 g 2,2'-azobis(2-methyl-propionamidine)dihydrochloride used as blowing agent, the polymerization was initiated. Thorough mixing of the catalyst solutions with the monomer solution is a precondition for a homogeneous polymerization in the whole polymer block. The maximum temperature of 100° C. (in a well-insulated polymerization vessel) was reached within 10 minutes. After completed polymerization, the polymer gel was crumbled, dried at 120° C. and ground to the desired size fraction. A cross-linked potassium acrylate/acrylamide copolymer was obtained which had a porous structure resulting from the entrapped nitrogen bubbles.

The screened size fraction 1000 to 2000 μm was used for additional examinations:

| | |
|---|---|
| average particle density (dry): | 1.30 g/cm³ |
| average particle density (swollen): | 0.96 g/cm³ |
| floatability in tap water: | 100% of particles after 1 h |
| | 100% of particles after 120 h |
| floatability in 0.9% NaCl-solution: | 100% of particles after 1 h |
| | 100% of particles after 120 h |
| floatability in sea-water: | 100% of particles after 1 h |
| | 100% of particles after 24 h |
| | 32% of particles after 120 h |

The absorption capacity amounted to 140 ml/g of tap water, 110 ml/g of 0.9% NaCl-solution, and 75 ml/g of sea-water. The average particle density was determined pycnometrically. The particle density of the swollen particles, which depends on the swelling degree, was determined after 1. hour of swelling.

EXAMPLE 2

The polymerization was conducted with 20 g blowing agent 2,2'-azobis(2-methylpropionamidine)dihydrochloride under the same conditions as in Example 1. After polymerization, the polymer gel was crumbled, dried at 120° C., and ground to the desired size fraction. A cross-linked potassium acrylate/acrylamide copolymer having a porous structure and entrapped nitrogen bubbles resulted.

The screened size fraction 1000 to 2000 μm was used for further examinations:

| | |
|---|---|
| average particle density (dry): | 1.25 g/cm³ |
| average particle density (swollen): | 0.95 g/cm³ |
| floatability in tap water: | 100% of particles after 1 h |
| | 100% of particles after 120 h |
| floatability in 0.9% NaCl-solution: | 100% of particles after 1 h |
| | 100% of particles after 120 h |
| floatability in sea-water: | 100% of particles after 1 h |
| | 100% of particles after 24 h |
| | 50% of particles after 120 h |

The absorption capacity amounted to 135 ml/g of tap water, 110 ml/g of 0.9% NaCl-solution, and 85 ml/g of sea-water.

EXAMPLES 3 AND 4

The polymerization was conducted under the same conditions as in Examples 1 and 2 a) with 2.9 g and b) with 10.0 g blowing agent 4,4'-azobis(4-cyanovaleric acid). After polymerization, the polymer gel was crumbled, dried at 120° C. and ground to the desired size fraction. A cross-linked potassium acrylate/acrylamide copolymer resulted having a porous structure and entrapped nitrogen bubbles.

The screened size fraction 1000 to 2000 μm was used for further examinations:

| | | |
|---|---|---|
| a) | average particle density (dry): | 1.40 g/cm³ |
| | average particle density (swollen): | 0.995 g/cm³ |
| b) | average particle density (dry): | 1.29 g/cm³ |
| | average particle density (swollen): | 0.99 g/cm³ |
| floatability in tap water: | | a) 35% of particles after 1 h |
| | | b) 85% of particles after 1 h |

EXAMPLES 5 AND 6

The polymerization was conducted under the same conditions as in Examples 3 and 4, except that a terpolymer of acrylamide, acrylic acid, and acrylamido(2-methylpropane) sulfonic acid (AMPS) was prepared in the ratio 70/28/02 mole-%. 5.0 g 4,4'-azobis(4-cyanovaleric acid) was added as blowing agent to the monomer solution. After completion of the polymerization, the polymer gel was crumbled, dried at 120° C., and ground to the desired size fraction. A cross-linked potassium acrylate/acrylamide/AMPS-terpolymer having a porous structure and entrapped nitrogen bubbles resulted. The batch was repeated twice to establish reproducibility.

| | | |
|---|---|---|
| a) | average particle density (dry): | 1.31 g/cm³ |
| | average particle density (swollen): | 0.985 g/cm³ |
| b) | average particle density (dry): | 1.33 g/cm³ |
| | average particle density (swollen): | 0.98 g/cm³ |
| floatability in tap water: | | a) 80% of particles after 1 h |
| | | b) 82% of particles after 1 h |

EXAMPLES 7 AND 8

The polymerization was conducted under the same conditions as in Example 1 a) with 2.9 g and b) with 10.0 g blowing agent 2,2'-azobis[2-(2-imidazoline-2-yl)propane] dihydrochloride. After completed polymerization, the polymer gel was crumbled, dried at 120° C., and ground to the desired size fraction. A cross-linked copolymer resulted having a porous structure and entrapped nitrogen bubbles.

The screened size fraction 1000 to 2000 μm was used for further examinations:

| | | |
|---|---|---|
| a) | average particle density (dry): | 1.49 g/cm³ |
| | average particle density (swollen): | 0.995 g/cm³ |
| b) | average particle density (dry): | 1.45 g/cm³ |
| | average particle density (swollen): | 0.99 g/cm³ |
| | floatability in tap water: | a) 45% of particles after 1 h |
| | | b) 58% of particles after 1 h |

EXAMPLES 9 TO 13

The polymerization was conducted under the same conditions as in Example 1 with 2.9 g of each of the following blowing agents:

a) 2,2'-azobis[2-(4,5,6,7-tetrahydro-1H-1,3-diazepine-2-yl)propane]dihydrochloride,
b) 2,2'-azobis[2-(5-hydroxy-3,4,5,6-tetrahydropyrimidine-2-yl)propane]dihydrochloride,
c) 2,2'-azobis{2-[1-(2-hydroxyethyl)-2-imidazoline-2-yl]propane}dihydrochloride, and
d) 2,2'-azobis[2-methyl-N-(2-hydroxyethyl)propionamide].

After completed polymerization, the polymer gel was crumbled, dried at 120° C., and ground to the desired size fraction. A cross-linked copolymer resulted having a porous structure and entrapped nitrogen bubbles.

The screened size fraction 1000 to 2000 μm was used for further examinations:

| | |
|---|---|
| average particle density (dry): | a) 1.49 g/cm³ |
| | b) 1.54 g/cm³ |
| | c) 1.52 g/cm³ |
| | d) 1.54 g/cm³ |
| average particle density (swollen): | a) 0.99 g/cm³ |
| | b) 0.99 g/cm³ |
| | c) 0.995 g/cm³ |
| | d) 0.995 g/cm³ |
| floatability in tap water: | a) 62% of particles after 1 h |
| | b) 58% of particles after 1 h |
| | c) 45% of particles after 1 h |
| | d) 32% of particles after 1 h |

EXAMPLE 14

In a polymerization vessel, 256 g acrylic acid was placed first, diluted with 335 g water and neutralized with 209 g sodium hydrogencarbonate. Then, 1.8 g triallylamine was dissolved in the monomer solution, the monomer solution cooled to 10° C. and blown out with nitrogen. After addition of the catalyst solutions (0.9 g sodium peroxidisulfate, 0.2 g hydrogen peroxide (35%), and 0.01 g ascorbic acid) and 8.8 g 4,4'-azobis(4-cyanovaleric acid) used as blowing agent, the polymerization was started. Within 7 minutes the maximum temperature of 103° C. was reached. After polymerization, the polymer gel was crumbled, dried at 150° C. and ground to the desired size fraction. A cross-linked acrylic acid homopolymer, partially as sodium salt, was obtained having a porous structure resulting from the entrapped nitrogen bubbles.

The screened size fraction 850 to 2000 μm was used for further examinations:

| | |
|---|---|
| average particle density (dry): | 1.70 g/cm³ |
| average particle density (swollen): | 0.99 g/cm³ |
| floatability in tap water: | 86% of particles after 1 h |
| | 80% of particles after 24 h |
| floatability in 0.9% NaCl-solution: | 65% particles after 1 h |
| floatability in sea-water: | 60% of particles after 1 h |

EXAMPLE 15

Under the same conditions as in Example 14 the polymerization was conducted using also 8.8 g blowing agent 4,4'-azobis(4-cyanovaleric acid), differing from Example 14, however, the acrylic acid monomer solution was neutralized with 310 g potassium hydroxide solution. After completion of the polymerization, the polymer gel was crumbled, dried at 150° C., and ground to the desired size fraction. A cross-linked acrylic acid homopolymer, partially as potassium salt, was obtained having a porous structure and entrapped nitrogen bubbles.

The screened size fraction 850 to 2000 μm was used for further examinations:

| | |
|---|---|
| average particle density (dry): | 1.63 g/cm³ |
| average particle density (swollen): | 0.97 g/cm³ |
| floatability in tap water: | 100% of particles after 1 h |
| | 96% of particles after 24 h |
| floatability in 0.9% NaCl-solution: | 95% of particles after 1 h |
| floatability in sea-water: | 80% of particles after 1 h |

EXAMPLES 16 TO 21

256 g acrylic acid was placed in a polymerization vessel first, diluted with 335 g water and neutralized with 200 g sodium hydroxide solution (50%). Then, 0.77 g triallylamine was dissolved in the monomer solution, the monomer solution cooled to 10° C., blown out with nitrogen, and the polymerization started with the same catalyst system as in Example 14. The following table 1 shows the added amounts of 2,2'-azobis(2-methylpropionamidine) dihydrochloride (ABAH) and 4,4'-azobis(4-cyanovaleric acid) (ABCVA). The maximum temperatures of 100° to 102° C. were achieved within 7 to 12 minutes. After completion of the polymerization, the polymer gels were crumbled, dried at 150° C. and ground to the desired size fraction. The thus produced cross-linked acrylic acid homopolymers, partially as sodium salts, have a porous structure which was achieved by the entrapped nitrogen bubbles. For comparison purposes, another polymer with only 0.08%-wt. of ABAH was prepared which could not have a porous structure owing to the small amount of ABAH which completely decomposed during polymerization.

The screened size fractions 150 to 850 μm were then used to determine the absorption rate and the absorption capacity according to the tea bag test.

The liquid absorption of 0.2 g test substance was determined gravimetrically in a tea bag after 15, 60, and 600 seconds. The retention value was also determined gravimetrically after centrifuging in a centrifuge, e.g. in a commercial spin dryer, at 1400 rpm, the value was then expressed in terms of 1 g of product. 0.9% NaCl-solution was used as test liquid.

TABLE 1

Dependence of absorption rate and absorption capacity on the added ABAH or ABCVA amounts

|  | Additive | Added amount (%-wt.) | Tea bag 15 sec. (g/g) | Tea bag 60 sec. (g/g) | Tea bag Retention (g/g) |
|---|---|---|---|---|---|
| Example 16 | ABAH | 0.28 | 10.5 | 21.1 | 34.3 |
| Example 17 | ABAH | 0.58 | 12.4 | 25.8 | 38.8 |
| Example 18 | ABAH | 1.08 | 18.2 | 34.4 | 40.2 |
| Example 19 | ABCVA | 0.2 | 10.2 | 16.7 | 32.9 |
| Example 20 | ABCVA | 0.5 | 9.7 | 17.6 | 36.7 |
| Example 21 | ABCVA | 1.0 | 10.1 | 27.7 | 41.0 |
| Comparison | ABAH | 0.08 | 8.1 | 13.1 | 33.6 |

I claim:

1. A water-swellable, cross-linked, particulate polymer based on acrylic acid and its derivatives and having a porous structure, a high absorption capacity, and a high absorption rate for water and/or liquids, characterized in that the porous structure is formed by nitrogen dispersed in the polymer and that the polymer particles in dry condition have a density of above 1.0 g/cm$^3$ and in swollen condition have a density of below 1.0 g/cm$^3$; wherein said polymer is formed in the presence of at least one cross-linking di- or polyfunctional monomers; and wherein said polymer is formed in the presence of an initiator and blowing agent comprising at least one azo compound in an amount of between 0.1 to 5.0% wt., relative to the total monomer solution.

2. The water-swellable, cross-linked, particulate polymers according to claim 1 characterized in that the polymer particles in swol- len condition have an average particle density of 0.900 to 0.999 g/cm$^3$ and that the particle-size distribution of the particles is in a range of 0.1 to 5 mm.

3. The water-swellable, cross-linked, particulate polymers according to claim 2 characterized in that the particle-size distribution is in a range of 0.8 to 3 mm.

4. The water-swellable, cross-linked, particulate polymers according to claim 1 characterized in that they are built up of at least one of the following monomers: acrylic acid, methacrylic acid, acrylamidopropane sulfonic acid, the alkali, alkaline-earth, and ammonium salts of the above acids, as well as of acrylamide and methacrylamide.

5. The water-swellable, cross-linked, particulate polymers according to claim 4 characterized in that they are built up as copolymers of at least one of the monomers according to claim 4 and at least one of the following monomers: acrylonitrile, methacrylonitrile, vinyl pyrrolidone, a water-soluble polymerizable acid and its salt, a hydroxy group-containing ester of a polymerizable acid, an amino group-containing and ammonium group-containing ester and amide of a polymerizable acid, and optionally other monomers partially soluble in water in portions of up to 20%-wt., relative to the total monomer quantity, and of at least one cross-linking di- or polyfunctional monomer, and optionally a graft polymer of the mentioned monomers with oligosaccharides and/or polysaccharides and/or polyvinyl alcohol.

6. The water-swellable, cross-linked, particulate polymers according to claim 5 characterized in that they are built up of maleic acid, fumaric acid, itaconic acid, and/or vinyl sulfonic acid as water-soluble polymerizable acid.

7. The water-soluble, cross-linked, particulate polymers according to claim 5 characterized in that they are built up of a hydroxyethyl- and hydroxypropyl ester of acrylic acid and/or methacrylic acid as hydroxy group-containing ester of a polymerizable acid.

8. The water-soluble, cross-linked, particulate polymers according to claim 5 characterized in that they are built up of a dialkyl aminoester of a polymerizable acid.

9. The wate-soluble, cross-linked, particulate polymers according to claim 8 characterized in that they are built up of a dimethyl- and diethylaminoalkyl ester of acrylic acid and/or methacrylic acid.

10. The water-swellable, cross-linked, particulate polymers according to claim 5 characterized in that they are built up of a trimethyl- and trimethylammonium alkylester of acrylic acid and/or methacrylic acid and a corresponding amide.

11. The water-swellable, cross-linked, particulate polymers according to claim 5 characterized in that they comprise portions of the monomers which are partially soluble in water of up to 10%-wt.

12. The water-swellable, cross-linked, particulate polymers according to claim 1 characterized in that they are built up of 80 to 1 00%-wt., relative to the total monomers, of water-soluble monomers and of 0 to 20%-wt. of monomers which are only partially soluble or insoluble in water.

13. The water-swellable, cross-linked, particulate polymers according to claim 12 characterized in that they are built up of partially water-soluble or water-insoluble monomers of vinyl acetate, esters of acrylic and/or methacrylic acid having $C_1$ to $C_{10}$-alcohols, styrene, and/or alkylated styrenes.

14. A process for the production of a water-swellable, cross-linked, particulate polymer having a porous structure and a high absorption rate for water and/or aqueous liquids, comprising polymerizing or copolymerizing in aqueous solution a monomer selected from the group consisting of acrylic acid, methacrylic acid acrylamido methylpropane sulfonic acid, acrylamide and methacrylamide or copolymerizing said monomer with a water-soluble monomer and optionally a monomer only partially water-soluble or water-insoluble in amounts of up to 20%-wt., relative to the total monomer quantity, in the presence of at least one cross-linking di- or polyfunctional monomer, and optionally oligosaccharides and/or polysaccharides and/or polyvinyl alcohol, characterized in that the aqueous monomer solution comprises as polymerization initiator and blowing agent one or several azo compounds having a half-life of at least 10 hours at a temperature of 30° to 120° C., with the concentration of polymerization initiator and blowing agent, relative to the total monomer solution, amounting to 0.1 to 5.0%-wt., and that the polymer gel is crumbled, dried at 100° to 240° C., and ground.

15. The process for the production of water-swellable, cross-linked, particulate polymers according to claim 14 characterized in that the only partially water-soluble monomers to be polymerized are used in amounts of up to 10%-wt., relative to the total monomer quantity.

16. The process for the production of water-swellable, cross-linked, particulate polymers according to claim 14 characterized in that the concentration of polymer initiator and blowing agent amounts to 0.2 to 2.0%-wt., relative to the total monomer solution.

17. The process for the production of water-swellable, cross-linked, particulate polymers according to claim 14 characterized in that the polymer gel is dried at 120° to 180° C.

18. The process for the production of water-swellable, cross-linked, particulate polymers according to claim 14 characterized in that 2,2'-azobis(2-methylpropionamidine) dihydrochloride, 4,4'-azobis(4-cyanovaleric acid), or 2,2'-azobis[2-(4,5,6,7-tetrahydro-1H-diazepine-2-yl)propane] dihydrochloride alone or in admixture with other azo compounds are used as polymerization initiator and blowing agent.

19. The process for the production of water-swellable, cross-linked, particulate polymers according to claim 14 characterized in that the polymerization is conducted such that a temperature in the polymer gel of at least 100° C. is achieved.

20. The process for the production of water-swellable, cross-linked, particulate polymers according to claim 19 characterized in that the polymerization is conducted such that a temperature in the polymer gel of 110° to 120° C. is achieved.

21. A process for absorbing or retaining water or an aqueous liquid, comprising contacting water or aqueous liquid with the polymer of claim 1.

22. The process of claim 21, wherein said aqueous liquid is urine or blood.

23. In an article for absorbing or retaining a body fluid and containing an absorbent, the improvement wherein the absorbent is the polymer of claim 1.

24. The article of claim 23, wherein said article is a hygienic absorbent disposable article.

25. The article of claim 24, wherein said article is a diaper, incontinence pad, sanitary napkin or tampon.

26. A composition comprising the polymer of claim 1 and a fertilizer, plant protection agent, microbicidal substance, herbicide, insecticide, nematocide, pharmaceutical active substance, cosmetic active substance, dye, illuminant or perfume.

27. The composition of claim 26, containing a fertilizer or plant protection agent.

28. The composition of claim 26, containing an insecticide.

29. The composition of claim 28, wherein said insecticide controls mosquito larvae.

30. The process of claim 21, wherein the polymer is mechanically crumbled and placed into water or aqueous liquid, the polymer is swollen by the water or aqueous liquid and the swollen crumbled polymer is separated from the water or aqueous liquid.

* * * * *